Oct. 11, 1966 L. T. JOYAL 3,277,561

METHOD OF MAKING CROWNED PULLEYS

Filed Feb. 10, 1964 2 Sheets-Sheet 1

INVENTOR.
LEO T. JOYAL
BY *Hobbs & Easton*
ATTORNEYS

United States Patent Office 3,277,561
Patented Oct. 11, 1966

3,277,561
METHOD OF MAKING CROWNED PULLEYS
Leo T. Joyal, Mishawaka, Ind., assignor to Dodge Manufacturing Corporation, Mishawaka, Ind., a corporation of Indiana
Filed Feb. 10, 1964, Ser. No. 343,743
8 Claims. (Cl. 29—159)

The present invention relates to pulleys and more particularly to a method of making a crowned pulley for use primarily with belt conveyor systems and to a method of fabricating crowned pulleys from metal sheet and plate material.

Crowned pulleys extensively used in belt conveyor systems consist of generally cylindrical-shaped sheet metal rims with end discs welded in the ends of the rims and containing a hub structure for mounting the pulley on a shaft extending longitudinal therethrough. Since a crown is necessary on conveyor pulleys in order to effectively train the conveyor belt thereon, difficulty is encountered in fabricating the rim in that simple rolling operations can not be satisfactorily used. In the past, the rims of the crowned conveyor pulleys have been fabricated by stamping or rolling the two halves of the rim and then welding the halves together. In the rolling method, the longitudinal edges of the halves must be trimmed before they are joined, since the edges or tails are only partially formed during the rolling operation. Allowance for the removed edge must be made in the original stock, thus inherently resulting in a substantial waste of material from the use of the rolling method. While the loss of material is not involved in the stamping method, the dies are relatively large and expensive and separate dies are required for each thickness of material used in the fabrication of the rim. It is therefore one of the primary objects of the present invention to provide a crowned pulley having a one-piece rim and hence only one longitudinally welded seam, which can be produced by relatively simple fabricating operations using die parts of relatively simple construction and standard metal fabricating equipment.

Another object of the present invention is to provide a relatively simple method of producing from metal sheet and plate material a crowned pulley having a one-piece rim with a single welded seam.

Still another object of the invention is to provide a method of forming a one-piece rim for a crowned pulley from sheet metal and plate which can be performed on sheet and plate material of various thicknesses on a single set of dies for each diameter pulley, and which can be used to produce pulleys of different lengths without changing the dies.

A further object of the invention is to provide a method of making a pulley with a one-piece crowned rim, the tolerances of which can be closely maintained, and which can readily be assembled with the end discs and reinforcing discs and welded without incorporating backup bars on the inner side of the rim at the weld.

Another object is to provide a method of producing rims for crowned pulleys, which can be performed in three relatively simple steps and in which no special fabricating skills or undue care are required to obtain accurately formed rims.

Additional objects and advantages of the present invention will become apparent from the following description and accompanying drawings, wherein.

Figure 1:
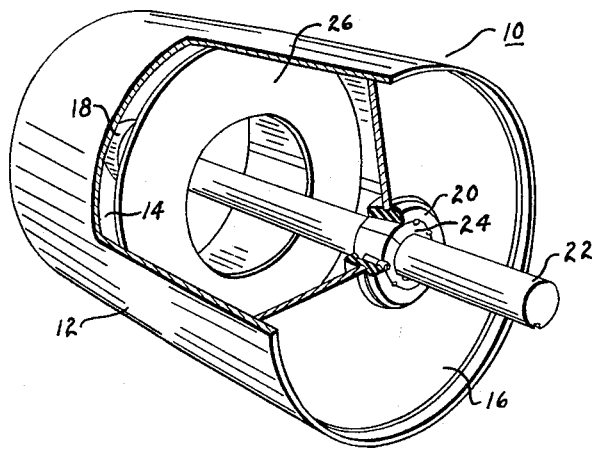
FIGURE 1 is a perspective view of a conveyor pulley embodying the present invention with a portion broken away to show the internal structure.
Figure 2:
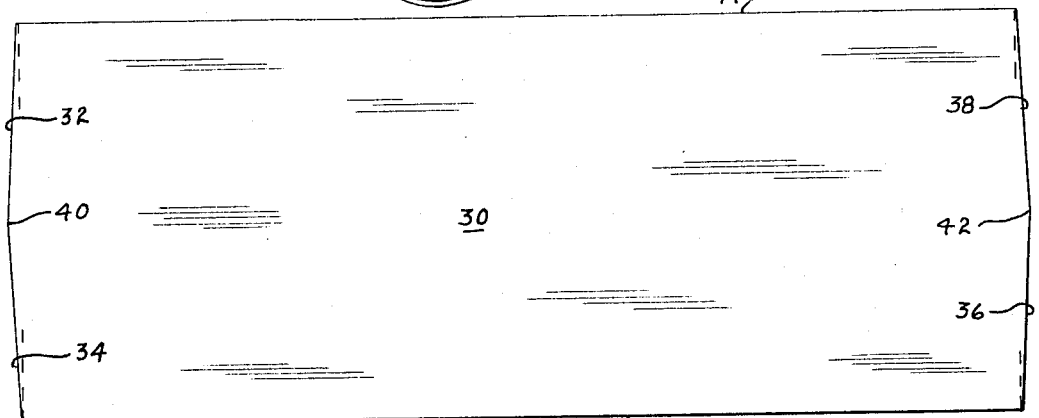
FIGURE 2 is a plan view of a blank used in the present method to form the rim of the pulley shown in FIGURE 1.

Referring more specifically to the drawings and to FIGURE 1 in particular, numeral 10 designates generally the conveyor pulley embodying the present invention and consisting of a rim 12, end discs 14 and 16, and hubs 18 and 20 joined rigidly to discs 14 and 16, respectively. The pulley is mounted on a shaft 22 and secured thereto by a bushing 24 in hubs 18 and 20. The type of hub and bushing as shown in FIGURE 1 is particularly adapted for this type of pulley; however, various other types of hubs and bushings can be used if desired. In the pulley illustrated in FIGURE 1, a reinforcing disc 26 is employed to give support to the center of the pulley. The pulley may be of various lengths and diameters, and on the smaller pulleys the reinforcing disc 26 may be omitted.

The present invention is directed primarily to the construction of rim 12 and to the method of forming the rim. The present rim is crowned preferably with the greatest diameter at the center and diminishing in diameter uniformly from the center to the ends; however, various crowned configurations may be used, including a substantially flat center with either uniform or non-uniform tapering margins. The present description will be directed primarily to a rim having the greatest diameter at the center and uniformly tapering sides extending to the two ends of the rim.

Figure 3:
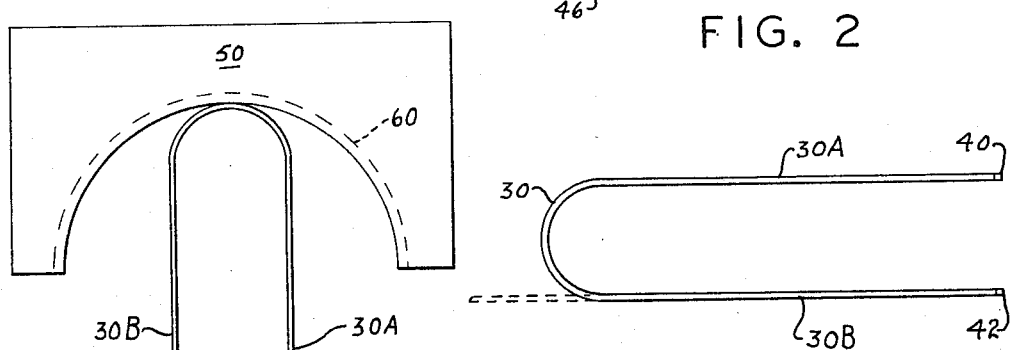
FIGURE 3 is a side elevational view of the blank of FIGURE 2 showing the blank formed into a U-shape representing one of the steps of the method.

The present method is performed in the manner illustrated in FIGURES 2 through 8, the steps consisting of forming a flat sheet or plate 30 with angular end sections 32, 34, 36 and 38 joining one another at the center of the respective ends at numerals 40 and 42. The angularity of the four end sections with respect to two parallel sides 44 and 46 is determined by the magnitude of the crown on the final pulley rim. After blank 30 has been formed in the manner illustrated in FIGURE 2 with the tapered ends, the blank is bent or folded by a pair of forming rollers or by any other suitable forming means into a U-shaped configuration, as illustrated in FIGURE 3, with the two ends substantially on the same plane.

Figure 4:
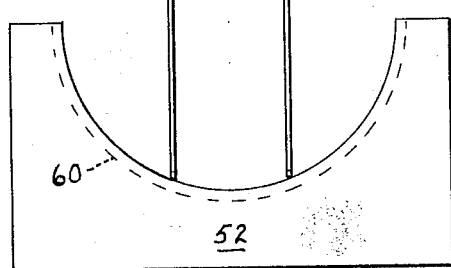
FIGURE 4 is an elevational view of the two dies used in practicing the present method to make the rim of the pulley shown in FIGURE 1, showing the blank therein as formed in FIGURE 3, ready for the next step of the method.
Figure 5:
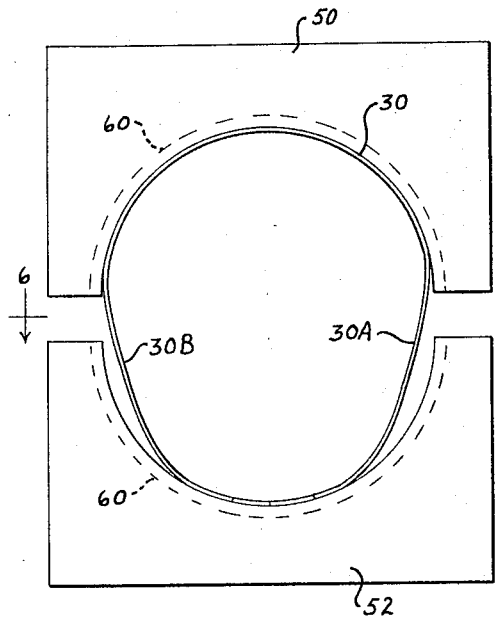
FIGURE 5 is an elevational view of the two dies and blank with the dies approaching the fully closed position and the blank approaching the shape of the fully formed pulley rim.
Figure 7:
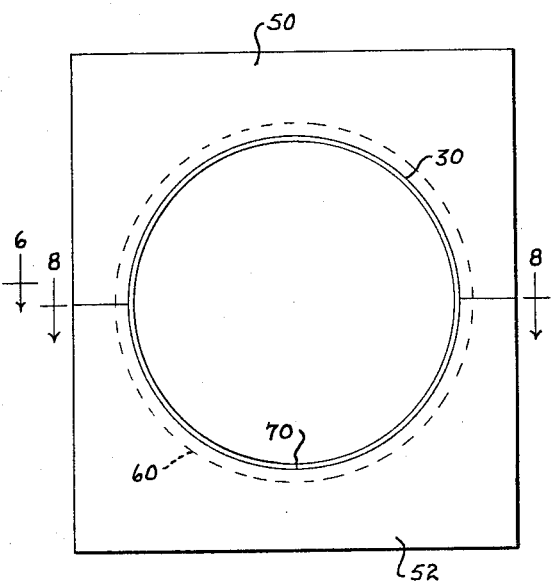
FIGURE 7 is an elevational view of the dies in their fully closed position and the blank in its fully formed condition.
Figure 6:
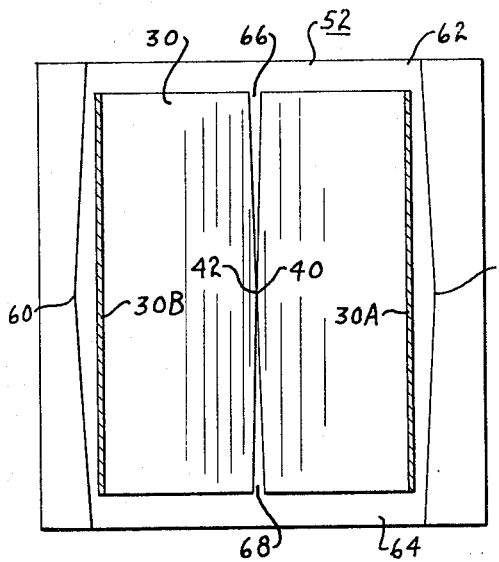
FIGURE 6 is a top plan view of the lower die and a horizontal cross sectional view of the partially formed blank, the section being taken on line 6—6 of FIGURE 5.

After the blank has been formed into the U-shaped configuration, it is placed in forming dies 50 and 52 which are mounted in a press and which are adapted to be moved by the press from the fully opened position shown in FIGURE 4 to the fully closed position shown in FIGURE 7. As the die sections 50 and 52 are moved from the fully opened position toward closed position, the sides 30A and 30B buckle or bend outwardly and the two ends slide or slip inwardly toward one another until the center points 40 and 42 contact one another, as illustrated in FIGURE 6. Further closing of the dies creates additional pressure on the blank, thereby forcing the walls outwardly into firm engagement with the internal walls of the dies. As the dies are closed and the operation progresses, the external walls of blank 30 are forced into firm engagement with the internal walls of the dies throughout their entire area and the ends of the blank are forced into contact with one another throughout their entire length.

Figure 8:
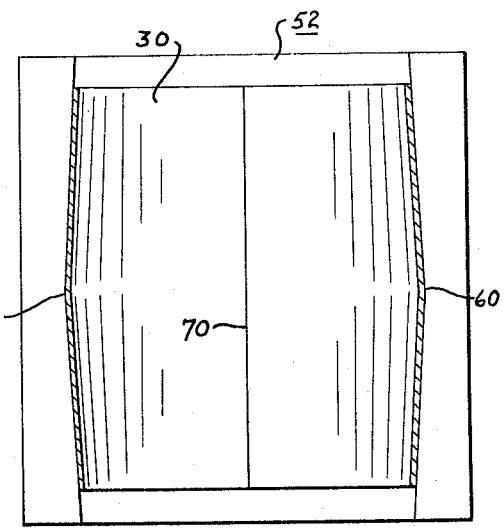
FIGURE 8 is a top plan view of the lower die and a horizontal cross sectional view of the fully formed rim, the section being taken on line 8—8 of FIGURE 7.

As illustrated in FIGURES 6 and 8, the internal wall of the die cavity is contoured to the desired shape of the external surface of the final crowned pulley rim. Since the type of crown desired on the rim, in the illustrated embodiment, has the largest diameter at the center with uniform tapering sides extending from the center to the edge, the internal surface of the die is likewise provided with that same contour, i.e., with the walls of the die cavity having the greatest diameter at the center 60 and tapering inwardly uniformly from the center to the two ends 62 and 64 of the dies. As the operation is performed, the circumferential center portion of the blank is forced into contact with the center portion 60 of the die and the margin edges of the blank are compressed until the space 66 and 68 between the two ends of the blank, are fully eliminated, as shown in FIGURE 6, are fully eliminated, as illustrated in FIGURE 8, thus providing a straight line seam 70 between the two ends. One of the advantages of the present method of fabricating crowned pulley rims is that the operation can be performed on material of different thicknesses and widths on a single set of dies. This is possible since in the present operation no core or internal die structure is employed. A separate set of dies is required for each diameter pulley and for each different crown on the pulley. As can be readily appreciated from the drawings of FIGURES 6 and 8, the shape and angularity of end sections 32, 34, 36 and 38 must be varied as the contour of the crown is varied in order to provide the closed, straight line seam 70 shown in FIGURE 8.

After the rim has been fully formed, as illustrated in FIGURES 7 and 8, dies 50 and 52 are moved to their fully opened position and the rim is removed from the die cavity. The rim is then welded at seam 70 by an operation consisting in placing the seam over a copper mandrel having a crown of the same configuration as the internal wall of the rim, welding the two ends of the seams while the ends of the blank are held in slightly separated position, and then welding the entire seam. This method has been found to assure 100% full penetration of the weld, thus giving an effective, sound joint without causing an imbalance in the circumference of the rim. The two end discs containing the hubs are then placed in the ends of the rim and welded securely in place. In the larger pulleys, the reinforcing disc 26 is preferably used, the disc being placed in the rim before the rim is welded, and then the reinforcing disc being welded in place after seam 70 has been welded. Since the reinforcing disc 26 would interfere with the procedure of welding seam 70 described above, the seam is welded first from one end using a mandrel extending from the respective end to the reinforcing disc and then from the other end using the same mandrel extending to the reinforcing disc.

As seen from the foregoing, the present method includes several relatively simple steps consisting in forming tapered ends on the end of the metal blank, folding the metal blank until it forms a substantially U-shaped configuration, placing the U-shaped structure in a two-piece die having the internal wall corresponding to the final crowned shape of the rim with the curved portion of the blank engaging one die section and the two ends engaging the other die section, closing the die to cause the leg portions of the U-shaped structure to buckle outwardly, compressing the longitudinal edges of the circumferential blank until the edges of the two ends of the blank are in contact with one another and form a straight line seam, and thereafter welding the seam. This method produces an accurately formed true crowned rim and can be performed satisfactorily on relatively thin to relatively thick material.

While only one embodiment of the crowned pulley and one embodiment of the method have been described in detail herein various changes and modifications may be made in both the pulley and method without departing from the scope of the invention.

I claim:

1. A method of making a crowned rim for a pulley from metal sheet or plate material by using a die having a cavity substantially the same shape as the periphery of the final crowned rim and being separated into two sections in the axial direction, comprising forming a flat metal blank with both ends tapered from the center to the opposite edges, folding the blank into a substantially U-shaped configuration, placing said folded blank in said die with the folded portion in contact with one die section and the two ends in contact with the other die section, compressing said blank with said die sections to buckle the legs of said U-shaped blank, forcing said ends into contact with one another at the center thereof, compressing the edges of said blank until said ends are in contact with one another throughout their length, and the external walls of the blank are in contact with the internal walls of the die sections, initially welding a small portion of the two ends together with the edges thereof separated slightly, and welding the seam formed by the edges of said ends with one hundred percent penetration throughout the length of the seam.

2. A method of making a crowned rim for a pulley from metal sheet or plate material by using a die having a cavity substantially the same shape as the periphery of the final crowned rim and being separated into two sections in the axial direction, comprising forming a flat metal blank with both ends tapered from the center to the opposite edges, folding the blank into a substantially U-shaped configuration, placing said folded blank in said die with the folded portion in contact with one die section and the two ends in contact with the other die section, compressing said blank with said die sections to buckle the legs of said U-shaped blank, forcing said ends into contact with one another at the center thereof, compressing the edges of said blank until said ends are in contact with one another and the external walls of the blank are in contact with the internal walls of the die sections, initially welding a small portion of the two ends together with the edges thereof separated slightly, and welding the seam formed by the edges of said ends.

3. A method of making a crowned rim for a pulley from metal sheet or plate material by using a die having a cavity substantially the same shape as the periphery of the final crowned rim and being separated into two sections in the axial direction, comprising forming a metal blank with both ends tapered bilaterally to form a protruding center portion on each end, folding the blank into a substantially U-shaped configuration, placing said folded blank in said die with the folded portion in contact with one die section and the two ends in contact with the other die section, compressing said blank with said die sections, forcing said ends into contact with one another at the center theerof, compressing the edges of said blank until the external walls of the blank are in contact with the internal walls of the die sections, thereby forming the rim into a crowned shape, and welding the seam formed by the edges of said ends.

4. A method of making a crowned rim for a pulley from metal sheet or plate material by using a die having a cavity substantially the same shape as the periphery of the final crowned rim and being separated into two sections in the axial direction, comprising forming a metal blank with at least one end tapered bilaterally to form a protruding portion, folding the blank into a substantially U-shaped configuration, placing said folded blank in said die with the folded portion in contact with one die section and the two ends in contact with the other die section, compressing said blank with said die sections, forcing said ends into contact with one another at the center thereof to form the rim into a crowned shape, and joining the ends of said blank.

5. In a method of making a crowned rim for a pulley from metal sheet or plate material by using a die having a cavity substantially the same shape as the periphery of the final crowned rim and being separated into two sections in the axial direction: forming a metal blank with at least one end tapered bilaterally to form a protruding portion, folding the blank into a substantially U-shaped configuration, placing said folded blank in said die with the folded portion in contact with one die section and the two ends in contact with the other die section, compressing said blank with said die sections, forcing the protruding portion of said one end into engagement with the other end, and pressing the external surface of the blank into firm engagement with the internal surface of the die sections, thereby forming the rim into a crowned shape.

6. In a method of making a crowned rim for a pulley from metal sheet or plate material by using a die having a cavity substantially the same shape as the periphery of the final rim and being separated into two sections in the axial direction: forming a metal blank with at least one end having a protruding portion, folding the blank into a substantially U-shaped configuration, placing said folded blank in said die with the folded portion in contact with one die section and the two ends in contact with the other die section, compressing said blank with said die sections to buckle the legs of said U-shaped blank, and forcing the protruding portion of said one end into engagement with the other end and the blank into engagement with the walls of the die sections, thereby forming the rim into a crowned shape.

7. A method of making a pulley with a crowned rim from metal sheet or plate material by using a die having a cavity substantially the same shape as the periphery of the final crowned rim and being separated into two sections in the axial direction, comprising forming a flat metal blank with both ends tapered from the center to the opposite edges, folding the blank into a substantially U-shaped configuration, placing said folded blank in said die with the folded portion in contact with one die section and the two ends in contact with the other die section, compressing said blank with said die sections to buckle the legs of said U-shaped blank, forcing said ends into contact with one another at the center thereof, compressing the edges of said blank until said ends are in contact with one another and the external walls of the blank are in contact with the internal walls of the die sections, inserting a reinforcing disc, initially welding a small portion of the two ends together with the edges thereof separated slightly, welding the seam formed by the edges of said ends with one hundred percent penetration throughout the length of the seam first on one side of the center and then on the other side of the center, welding said reinforcing disc in place, and inserting and welding end discs in place.

8. A method of making a pulley with a crowned rim from metal sheet or plate material by using a die having a cavity substantially the same shape as the periphery of the final rim and being separated into two sections in the axial direction, comprising forming a metal blank with both ends tapered bilaterally forming protruding center portions, folding the blank into a substantially U-shaped configuration, placing said folded blank in said die with the folded portion in contact with one die section and the two ends in contact with the other die section, compressing said blank with said die sections, forcing said ends into contact with one another at the center thereof, compressing the edges of said blank until the external walls of the blank are in contact with the internal walls of the die sections, thereby forming the rim into a crowned shape, welding the seam formed by the edges of said ends, and inserting and welding end discs in place.

References Cited by the Examiner

UNITED STATES PATENTS

| | | | |
|---|---|---|---|
| 1,092,477 | 4/1914 | Einfeldt | 29—159.1 |
| 1,194,589 | 8/1916 | Barry | 29—159 |
| 1,680,985 | 8/1928 | Gilbert | 29—159 |
| 1,760,558 | 5/1930 | Klocke | 29—149.5 |
| 1,760,560 | 5/1930 | Kranz et al. | 29—159.3 |
| 1,906,273 | 5/1933 | Klocke | 29—149.5 |
| 2,200,569 | 5/1940 | Whitten | 29—159.1 X |
| 2,730,795 | 1/1956 | Bloss | 29—159 |
| 2,875,625 | 3/1959 | Schultz | 74—230.8 |
| 2,999,394 | 9/1961 | Firth | 74—230.8 |

JOHN F. CAMPBELL, *Primary Examiner.*

DON A. WAITE, THOMAS H. EAGER, *Examiners.*

J. A. WONG, *Assistant Examiner.*